United States Patent [19]

Paton

[11] 3,956,756

[45] May 11, 1976

[54] PATTERN PRINTING APPARATUS

[75] Inventor: Anthony David Paton, Harston, England

[73] Assignee: Imperial Chemical Industries, Inc., London, England

[22] Filed: Mar. 28, 1974

[21] Appl. No.: 455,724

Related U.S. Application Data

[63] Continuation-in-part of Ser. Nos. 369,727, June 13, 1973, abandoned, and Ser. No. 389,539, Aug. 20, 1973, abandoned, which is a continuation-in-part of Ser. No. 174,427, Aug. 24, 1971, abandoned.

[30] Foreign Application Priority Data

| | | |
|---|---|---|
| Aug. 26, 1970 | United Kingdom | 40970/70 |
| Oct. 3, 1970 | United Kingdom | 47113/70 |
| June 30, 1972 | United Kingdom | 30794/72 |

[52] U.S. Cl. .......... 346/75; 358/75
[51] Int. Cl.$^2$ .......... G01D 15/18
[58] Field of Search .......... 346/75; 178/5.2 R

[56] References Cited

UNITED STATES PATENTS

| | | | |
|---|---|---|---|
| 3,298,030 | 1/1967 | Lewis et al. | 346/75 |
| 3,373,437 | 3/1968 | Sweet et al. | 346/75 |
| 3,578,897 | 5/1971 | Stock | 178/5.2 R |

FOREIGN PATENTS OR APPLICATIONS

| | | | |
|---|---|---|---|
| 1,123,198 | 8/1968 | United Kingdom | 346/75 |

*Primary Examiner*—Joseph W. Hartary
*Attorney, Agent, or Firm*—Cushman, Darby & Cushman

[57] ABSTRACT

Pattern printing apparatus which prints by depositing on a surface to be printed moving relatively to the apparatus successively transverse rows of closely spaced small drops, the apparatus having at least one row of printing guns supplied with printing liquid under pressure to form parallel jets of printing liquid which break up into small drops, charge electrode means for each jet for uniquely charging drops formed in each jet, drop deflection means providing a substantially constant electrostatic field through which the drops formed in the jet path pass, and a drop intercepting device for intercepting drops in each jet which have been charged to a predetermined level, there being further provided signal generating means which make available for application to the charge electrode means a periodic voltage signal the periods of which are of duration sufficient to span the formation of a plurality of drops in each jet path, and, electrical means operative to apply the signal voltage at predetermined voltage levels during each period of the signal voltage to charge electrode means of the printing guns thereby to charge drops formed in the jet path of each gun, the drops from each printing gun which have been charged to the signal voltage level being thereby deposited on the printing surface in the length of a line section, the line sections of the printing guns together being thus occupied by a row of drops extending transversely with respect to the direction of relative movement between the apparatus and the printing surface.

14 Claims, 13 Drawing Figures

FIG 7
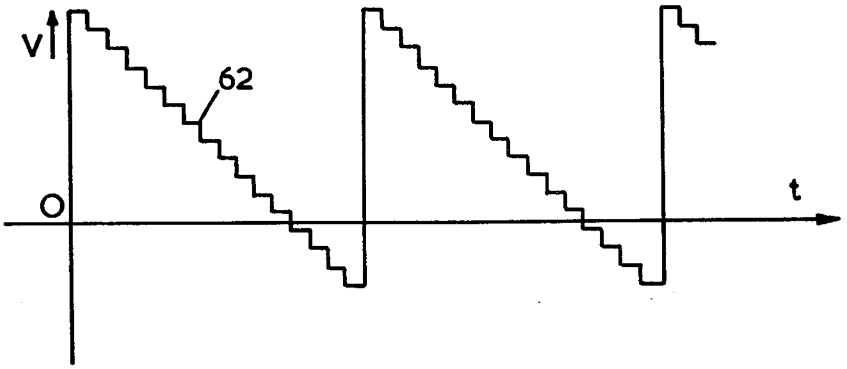
FIG 8
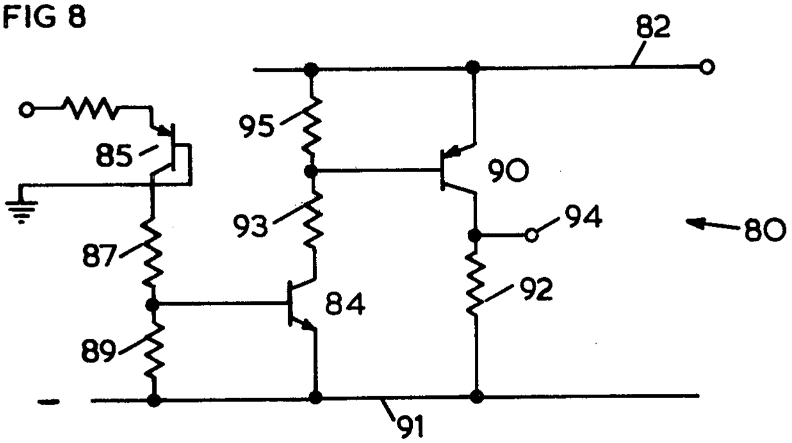
FIG 9
| A | B | C | 1 | 2 | 3 | 4 | 5 | 6 | 7 | 8 |
|---|---|---|---|---|---|---|---|---|---|---|
| O | O | O | 1 | O | O | O | O | O | O | O |
| O | O | 1 | O | 1 | O | O | O | O | O | O |
| O | 1 | O | O | O | 1 | O | O | O | O | O |
| O | 1 | 1 | O | O | O | 1 | O | O | O | O |
| 1 | O | O | O | O | O | O | 1 | O | O | O |
| 1 | O | 1 | O | O | O | O | O | 1 | O | O |
| 1 | 1 | O | O | O | O | O | O | O | 1 | O |
| 1 | 1 | 1 | O | O | O | O | O | O | O | 1 |

PATTERN PRINTING APPARATUS

This application is a continuation-in-part of my application Ser. No. 369727 filed 13th June 1973 now abandoned, and of my application Ser. No. 389539 filed 20th Aug. 1973, now abandoned, which application Ser. No. 389539 is a continuation of application Ser. No. 174427 filed 24th Aug., 1971 which is now abandoned.

THIS INVENTION relates to pattern printing apparatus and more particularly to such apparatus adapted to print by depositing on a surface to be printed during relative movement between the apparatus and the said surface successive rows of small drops of printing liquid extending transversely to the direction of relative movement.

It has been proposed to provide a recorder for printing video or facsimile images in which writing liquid under substantial pressure is supplied to a row of orifices thereby forming parallel jets which are directed towards a printing surface. Under the applied pressure, the jets tend to break up into streams of fine droplets and this tendency is stimulated by forming regularly spaced variations in the jet cross-sections. At the location of drop formation in each jet is situated a charge electrode which charges drops formed in the jet to a charge dependent upon the voltage on the charge electrode at the instant of drop separation. The uncharged drops then pass through a deflecting electrostatic field to drop intercepting means whilst the charged drops which also pass are deposited on the printing surface.

It is an object of the present invention to provide apparatus employing the general principles of the previously proposed recorder which is suitable for pattern printing, for example, of fabric or paper. A further object is to provide apparatus employing the general principles described in a form which is suitable for printing plural and multicolour patterns. Apparatus according to the invention is broadly applicable to the printing of pattern intelligence on a printing surface.

The present invention consists in pattern printing apparatus for printing by depositing on a surface to be printed during relative movement between the apparatus and the said surface, small drops of printing liquid in successive rows of contiguous drops extending transversely to said direction of relative movement, comprising a row of printing guns extending transversely to said direction of relative movement, each gun having an orifice, printing liquid supply means for supplying printing liquid under pressure to the orifice to form a jet of printing liquid directed towards the location in the apparatus of the said surface, means for imparting regularly spaced variations in the cross-section of the jet to stimulate drop formation, charge electrode means located adjacent the position in the jet path of drop separation to effect charging of drops formed in the jet path to a charge corresponding to a first voltage level or to a charge corresponding to any of a plurality of second voltage levels, drop deflection means for providing a substantially constant electrostatic field through which pass the drops formed in the jet path thereby to deflect each electrically charged drop in a direction transverse to said direction of relative movement as a function of the charge level on that drop, and drop intercepting means for intercepting those drops which have been charged to a charge corresponding to said first voltage level, the apparatus also including signal generating means for receiving electrical signals defining the pattern to be printed and controlling deposition in accordance with the received signal including means for producing a signal defining said first voltage level signal and means for producing an output signal of constant period which provides in each period thereof each of said second voltage levels and circuit means for receiving electrical signals defining the pattern to be printed and applying said first voltage level signal or said output signal to each of said charge electrode means in accordance with said received signals defining the pattern to be printed so that drops from each gun are intercepted by said drop intercepting means or are deposited on the surface to be printed to present a visually contiguous printing impression in a row extending transversely to said direction of relative movement, the deposited drops in successive rows forming a printed pattern.

The present invention also consists in pattern printing apparatus for printing by depositing on a surface to be printed, during relative movement between the apparatus and the printing surface, small drops of printing liquid in successive rows of contiguous drops extending transversely to said direction of relative movement, comprising a row of printing guns extending transversely to said direction of relative movement, each gun having an orifice, printing liquid supply means for supplying printing liquid under pressure to the orifice to form a jet of printing liquid directed towards the location in the apparatus of the said surface, means for imparting regularly spaced variations in the cross-section of the jet to stimulate drop formation, charge electrode means located adjacent the position in the jet path of drop separation to effect charging of drops formed in the jet path to a charge corresponding to a first voltage level or to a charge corresponding to any of a plurality of second voltage levels, drop deflection means for providing a substantially constant electrostatic field through which pass the drops formed in the jet path thereby to deflect each electrically charged drop in a direction transverse to said direction of relative movement as a function of the charge level on that drop, and, drop intercepting means for intercepting those drops which have been charged to a charge corresponding to said first voltage level, the apparatus also including control circuit means for producing a pattern control signal defining said pattern, means for applying said control signal to said electrode means so that drops from each gun are deposited in a line extending transversely to the direction of relative movement to form a visually contiguous line segment which is visually contiguous with line segments formed by other guns simultaneously depositing drops so that the deposited drops in successive rows form a printed pattern.

More particularly the present invention consist in pattern printing apparatus adapted to print by depositing on a surface to be printed, during relative movement between the apparatus and the said surface, small drops of printing liquid in successive rows of contiguous drops extending transversely to said direction of relative movement, comprising a row of printing guns extending transversely to said direction of relative movement, each gun having an orifice, printing liquid supply means for supplying printing liquid under pressure to the orifice to form a jet of printing liquid directed towards the location in the apparatus of the said surface, means for imparting regularly spaced variations in the cross-section of the jet to stimulate drop formation, charge electrode means located adjacent the position in the jet path of drop separation to effect charging of drops formed in the jet path to a charge corresponding to a first voltage level or to a charge corresponding to any of a plurality of second voltage levels, the first voltage level being either below or above any of the second voltage levels, drop deflection means for providing a substantially constant electrostatic field through which pass the drops formed in the jet path thereby to deflect electrically charged drops to an extent depending upon the charge levels on the drops, and, a drop intercepting device for intercepting those drops which have been charged to a charge corresponding to the first voltage level, signal generating means which make available for application to the charge electrode means of each printing gun an output of constant period the magnitude of the voltage of said signal at corresponding times during each period being constant and the period of which is sufficient to span the formation oof a plurality of drops in each jet path, and electrical switch means controlled by pattern information to control the application of the output signal at pre-determined voltage levels during each period thereof to charge electrode means of the printing guns thereby to charge drops formed in the jet path of each printing gun, each of the printing guns being arranged for the operating electrical parameters of the signal generating means so that successive drops produced by each gun in any sequence formed during a period of the output signal and charged to a charge corresponding to a second voltage level for deposition on the said surface as well as corresponding drops in sequences formed in successive periods of the output signal and charged to a charge corresponding to a second voltage level for deposition on the said surface are deposited at a spacing to present a visual printing impression of contiguous drops on the printing surface and successive print guns being spaced for the operating electrical parameters of the signal generating means so that all drops formed by one gun during any period of the output signal if charged to a charge corresponding to a second voltage level for deposition on the said surface and all the drops formed by the next adjacent gun during the same period of the signal voltage if charged to a charge corresponding to a second voltage level for deposition on the said surface are deposited at a spacing to present a visual printing impression of contiguous drops on the said surface, whereby, in operation, drops formed in the guns which are charged during each period of the output signal to a charge corresponding to a second voltage level are deposited on the said surface in a row extending transversely to the direction of relative movement between the apparatus and the said surface.

The first voltage level may be zero in which case the drops are uncharged and the gutter is so situated as to receive undeflected drops. Alternately the first voltage level may represent a positive or negative voltage in which event deflection occurs into the gutter.

In a preferred form of the apparatus suitable for multi-colour printing there is provided a pattern printing apparatus adapted to print by depositing on a surface to be printed during relative movement between the apparatus and the said surface small drops of printing liquid, comprising a plurality of rows of printing guns, each row of printing guns extending transversely to said direction of relative movement, corresponding guns in each row form groups of guns disposed longitudinally in said direction of relative movement, the guns in each group being directed towards the same location of the printing surface, each gun having an orifice, printing liquid supply means for supplying printing liquid under pressure to the orifice to form a jet of printing liquid directed towards the location in the apparatus of the printing surface, means for imparting regularly spaced variations in the cross-section of the jet to stimulate drop formation, charge electrode means located adjacent the position in the jet path of drop separation to effect charging of drops formed in the jet path to a charge corresponding to a first voltage level or to a charge corresponding to any of a plurality of second voltage levels, the first voltage level being either below or above any of the second voltage levels, drop deflection means for providing a substantially constant electrostatic field through which pass the drops formed in the jet path thereby to deflect electrically charged drops to an extend dependent upon the charge levels on the drops, and, a drop intercepting means for intercepting those drops which have been charged to a charge corresponding to the first voltage level, the apparatus also including signal generating means which make available for application to the charge electrode means of each printing gun an output signal of constant period, the magnitude of the voltage of said signal at corresponding times during each period thereof being constant and the period of which is sufficient to span the formation of a plurality of drops in each jet path, and electrical switch means controlled by pattern information to control the application of the output signal at predetermined voltage levels during each period thereof to charge electrode means of the printing guns thereby to charge drops formed in the jet paths of the printing guns and to charge electrode means in each group of printing guns so that the drop or drops charged to a charge corresponding to a second voltage level for deposition on the said surface in each group of printing guns during a period of signal voltage are deposited in a row extending transversely to the direction of relative movement between the apparatus and the said surface; each of said printing guns being arranged for the operating electrical parameters of the signal generating means so that successive drops therefrom in any sequence formed during a period of the output signal and charged to a charge corresponding to a second voltage level for deposition on the said surface as well as corresponding drops in sequence formed in successive periods of the output signal and charged to a charge corresponding to a second voltage level for deposition on the printing surface are deposited at a spacing to present a visual printing impression of contiguous drops on the said surface and successive print guns in each row being spaced for the operating electrical parameters of the signal generating means so that all the drops formed by one gun during any period of the signal if charged to a charge corresponding to a second voltage level for deposition on the said surface and all the drops formed by the next adjacent gun during the same period of the signal voltage if charged to a charge corresponding to a second voltage level for deposition on the said surface are deposited at a spacing to present a visual printing impression of contiguous drops on the said surface, whereby, in operation, drops formed in the guns which are charged during each period of the signal voltage to a charge corresponding to a second voltage level are deposited on the said surface in a row extending transversely to the direction of relative movement between the apparatus and the said surface, the deposited drops in successive rows forming a printed pattern.

Preferably, ther is further provided a pattern information store in which pattern information is stored in digital coded form each point of the pattern being represented as a multi-bit word, buffer store means into which pattern information from the digital store is loaded, means for transferring information loaded into the buffer store into decoding means, driver circuits connected each with a charge electrode and supplied from the decoding means and adapted, when supplied from the decoding means, to connect the output signal of constant period to a charge electrode means in each group of printing guns, whereby, when each row of printing guns is supplied with a different colour of printing liquid, the colour of each drop of printing liquid deposited on the said surface relates to the colour represented by the multi-bit word causing said drop to be deposited.

The term "small drops" denotes drops having a diameter of up to approximately 10 mms, and preferably having a diameter of from (1/100) mm (10 microns) to 1 mm.

The invention will now be described, by way of example, with reference to the accompanying, somewhat diagrammatic drawings in which:

FIG. 1, is a perspective view showing principal parts of pattern printing apparatus according to the invention, FIG. 2, is a longitudinal sectional elevation of the pattern printing apparatus of FIG. 1, FIG. 3, is a sectional view taken on the line III—III of FIG. 2, FIGS. 4*a* and 4*b* are plan views at the levels IV*a*—IV*a* and IV*b*—IV*b* respectively of FIG. 3, the view on IV-*b*—IV*b* showing the drops as deposited on the printing surface, FIG. 5, is a diagrammatic plan view of part of the apparatus of the other figures, FIG. 6, is a block schematic diagram of electronic control circuitry of the apparatus, FIG. 7, illustrates a voltage waveform which determines the level of charging of drops of printing liquid formed in the apparatus, FIG. 8, illustrates a circuit detail of the circuit diagram of FIG. 6, FIG. 9, is a truth table governing the operation of part of the circuit of FIG. 6.

Figure 1:
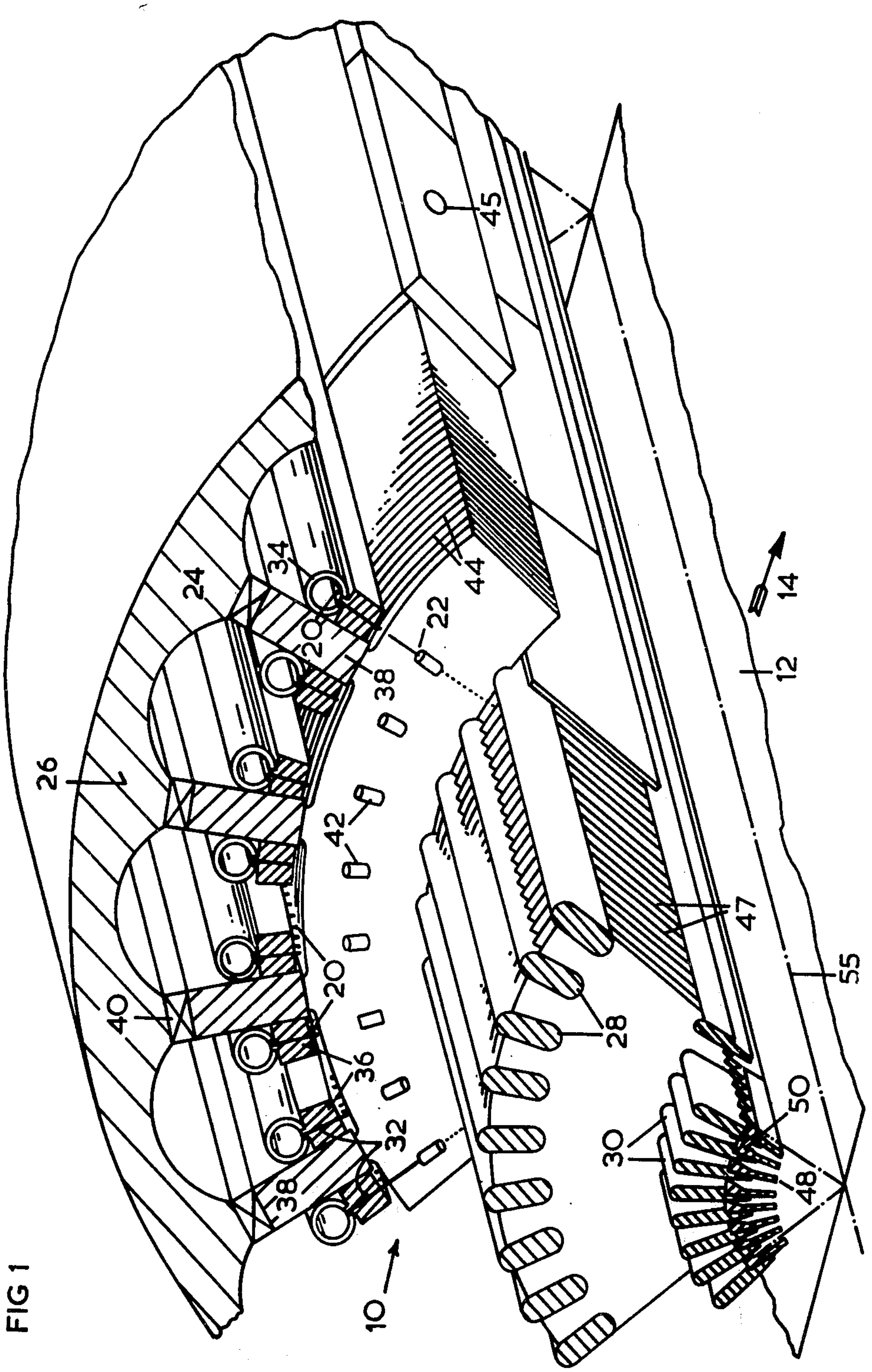
Figure 2:
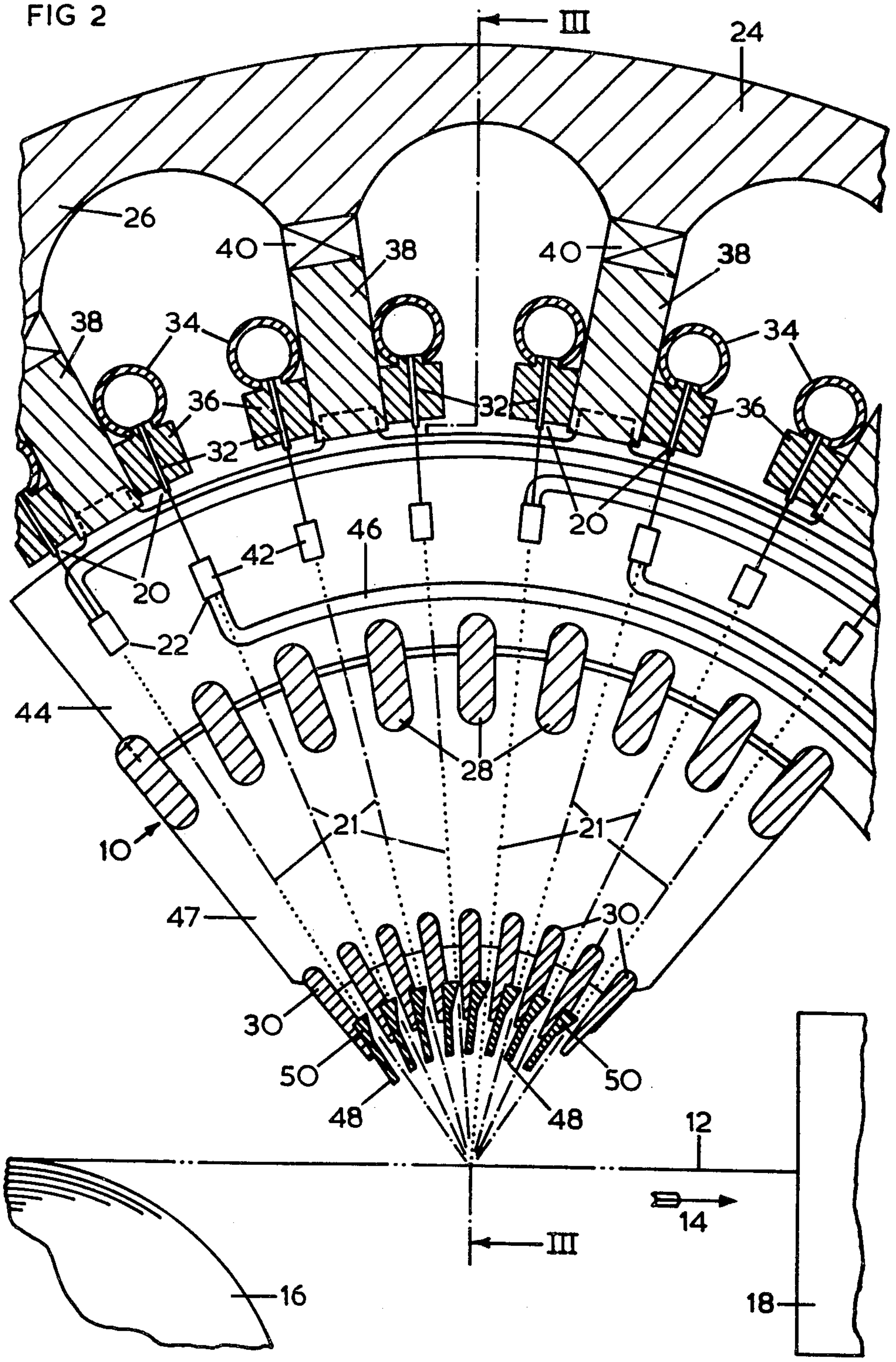

FIGS. 1 to 5 of the drawings illustrate a pattern printing apparatus 10 for effecting multi-colour printing on a fabric surface 12 which moves relatively to the apparatus 10 in the direction indicated by the arrow 14.

The apparatus 10 is adapted to print on the fabric surface 12 by depositing thereon, during movement of the surface 12 from a fabric roll 16 through the apparatus 10 to a printing dye solvent drier 18, small drops of printing liquid in successive rows of contiguous drops extending transversely to the direction of movement of the surface 12. To this end the apparatus provides eight rows 20 of printing guns, generally indicated by the reference 22, the rows each extending transvesely to the direction of motion of the surface 12. The rows of printing guns are mounted on a supporting structural frame 24 comprising an upper transversely disposed yoke member 26 intermediate transversely disposed support member 28 and lower transversely disposed support members 30, the member 26 and members 28 and 30 being secured to side members (not shown) of the structural frame at opposite side of the apparatus. Corresponding printing guns 22 in each row 20 form a group 21 disposed longitudinally with respect to the direction of motion of the said surface, the guns of each group being directed towards the same location on the said surface and forming an arcuately disposed array.

Each printing gun 22 includes an orifice provided by a nozzle 32 which communicates with a manifold 34, the latter providing all the nozzles 32 of a row 20 with a source of liquid printing ink supply under substantial pressure. The eight manifolds 34 respectively contain eight differently coloured liquid printing inks. The nozzles 32 of each row are carried in a housing 36 on the top of which sits the manifold 34 of that row. Pairs of the housings 36 are mounted on transversely disposed members 38 supported each by way of a piezo-electric vibrator 40 of known form on the yoke member 26 of the structural frame 24. The energisation of the piezo-electric crystals imparts vibrations to the nozzles 32, the amplitude of vibration being generally lengthwise of the nozzles and causing vibrations in the cross-sections of the jets from the nozzles which are regularly spaced along the length of the jets at intervals which depend upon the vibration frequency. The variations caused in the jet cross-sections stimulate break down of the jet into drops.

The dimensions of all of the nozzles are substantially equal as is the fluid pressure in the manifolds 34 so that the velocity of the jets is substantially the same. As the vibration frequency of all vibrators 40 is also the same, the number of drops in unit length of the jet path between each nozzle 32 and the surface 12 is substantially the same for all nozzles. Advantageously, the spacing between successive drops is approximately two and a quarter times the drop diameter.

By varying the pressure in the manifolds 34 the velocity of the drops formed and therefore the spacing between drops formed in each row of jet paths is controlled so that the number of drops in unit length between each nozzle row and the said surface 12 is equalised.

Each printing gun 22 further includes a charge electrode 42 of tubular form through which the liquid jet from the associated nozzle 32 is projected, the electrode 42 being positioned along the nozzle jet path at the location of drop separation. The charge electrode acts together with the liquid jet and associated nozzle, which is grounded, as a capacitor which, as hereinafter described, can be charged to a charge corresponding to one of a number of different voltage levels. The charge electrodes of each longitudinally disposed group of printing guns 22 are mounted between two printed circuit boards 44 which are supported by members 28 and 38, each charge electrode of the group being connected to the same end of one of the boards 44 by means of a conducting track 46 there being four such tracks formed on each side of board 44 which are connected to inputs 45. As hereinafter more fully described, an output signal of constant period comprising a number of different voltage levels is applied to one of the eight charge electrodes 42 of each printing gun group so that the electrode which is thereby charged charges to a predetermined level the drop which is at that time separating from the liquid jet.

Downstream of the charge electrode 42 in the jet path from each nozzle 32, each printing gun 22 is provided with a pair of longitudinally extending parallel plates 47 which are monted on the structural frame transverse members 28 and 30. The parallel plates 47 constitute deflection electrodes for charged drops passing there between, the potential difference between the plates 47 affording a substantially constant electrostatic field so that deflection of the charged drops passing between the plates takes place to an extent dependent upon the charge levels on the drops.

Each printing gun 22 further includes a drop intercepting device 48 which is mounted on the appropriate member 30 and provides a gutter 50 so disposed as to intercept drops in the corresponding nozzle jet path not required for deposition on the surface 12. Drops collected by the device 48 are conveyed through the inlet of a pump (not shown) which recirculates the printing liquid so collected.

The nozzles 32 can conveniently be provided by tubes for example of diameter equal to 75 microns the diameter of drops formed therefrom being 100 to 150 microns. A typical jet speed of twenty meters per second is employed, the jet being vibrated at 64,000 cycles per second. If the deposited pattern is, for example, one meter wide the pitch of drops deposited is 250 microns giving 4,000 printing points across the width of the fabric printing surface 12. The speed of travel of the printing surface is one meter per second and this means that there are sixteen million drop positions per square meter. The relationship between the drop diameter and the pitch of deposited drops is so selected that, if all the drops alight on the surface 12, the entire surface is effectively covered.

Each printing gun is capable of depositing some or all of the drops in a line section 52 16 drops (i.e. 4 m.m.) long so that there are accordingly provided 250 printing gun groups 21 across each meter of the width of the apparatus.

Because of the time delay between the deposition of successive drops and the deflection electrodes 47 being disposed longitudinally in the direction of motion of the surface 12 the deposited line sections 52 of drops, assuming the drops are sequentially charged by means of a cyclic voltage of the form illustrated in FIG. 7, because of the motion of the surface 12, are not collinear and are each inclined by a small angle to the direction at right angles to the motion of the surface 12, the small angle being:

$\tan^{-1}(1/n)$ where n = the number of drops deposited by each nozzle group 21 in each line section 52.

Figure 3:
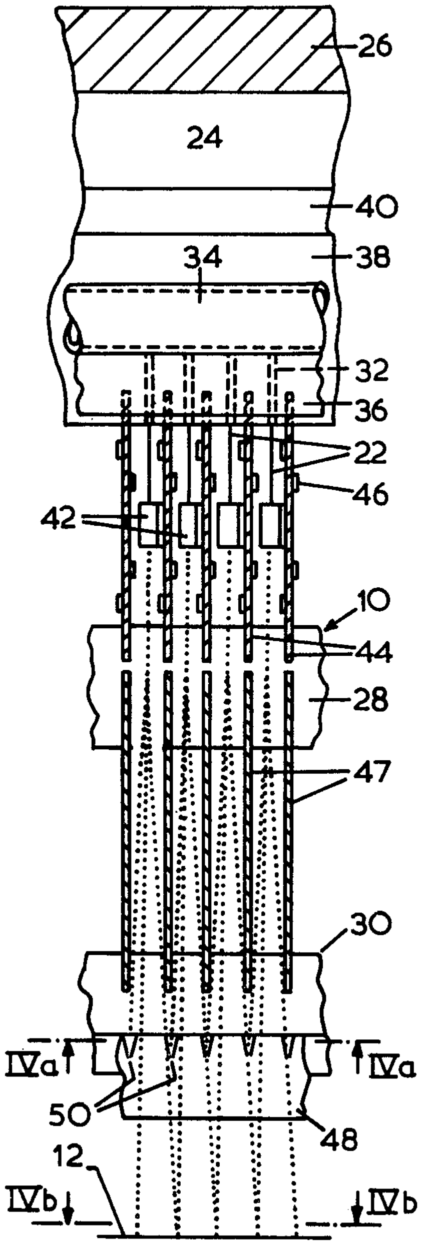
Figure 4A:
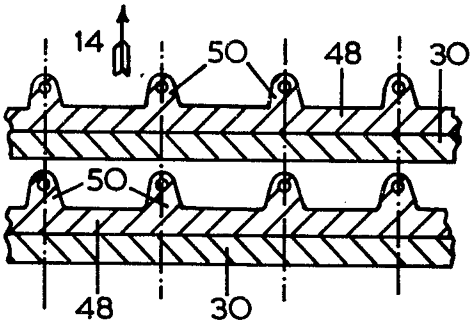
Figure 4B:
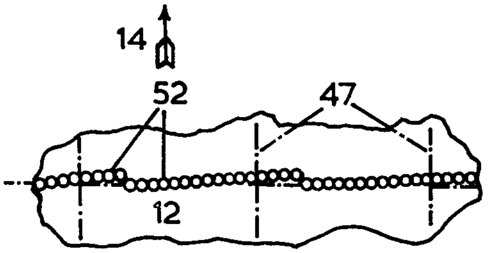
Figure 5:
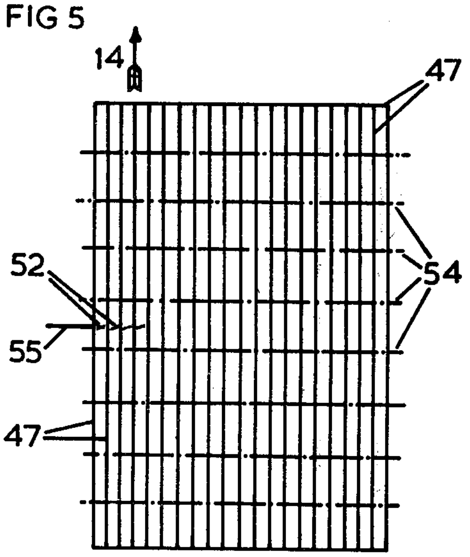

Referring to FIG. 3 it will be seen that drops in the jet paths from the nozzles 32 in each longitudinally extending group 21 of nozzles pass initially midway between the respective pairs of parallel deflector plates 47 and are deflected in sequences of sixteen drops, four to the left and twelve to the right. All drops which are not required for deposition on the surface 12 are so charged as to be deflected to the left into gutters 50. It will be seen that the drops of each sequence are deflected in accordance with the charge they carry and that the charges on the drops and the potential gradient of the electrostatic field between the plates 47 are such that the drop sequences are deposited in line sections of sixteen drops, the line sections forming a sawtoothed row of drops across the surface 12 and each line section having an inclination of:

$\tan^{-1}(1/16)$

It will be noted that as there are eight nozzles in each nozzle group 21 and as of the eight drops simultaneously produced in each nozzle group 21 normally only one drop at most is deposited, seven eighths of the printing inks is recirculated via the gutters 50.

It will be noted that the gutters 50 are located at a level midway between the printing surface 12 and the center height of the plates 47. This enables the sixteen drop sequences of charged drops, if they are all charged for deposition on the surface 12, to pass between the projecting parts of successive gutters (see FIG. 4*a*).

As the potential of alternate plates 47 is the same, the voltage fields between successive pairs of plates 47 are in opposite senses. In order therefore that deflection of the drops shall occur in the correct direction the voltages applied to the charge electrodes 42 of adjacent groups are of equal magnitude but of opposite sign.

It will be appreciated that instead of deflecting unwanted charged drops from each nozzle group 21 to gutter 50 individual to each nozzle within the group, the unwanted drops from pairs of corresponding nozzles in adjacent groups can be deposited in a common gutter. To this end the potential gradient between the plates 47 of successive groups would be in opposite senses while the associated charge electrodes 42 would be charged to the same extent and in the same sense.

It will also be understood that the drops in the jet paths from the nozzles of each group 21 need not pass initially midway between the associated deflector plates 47. Indeed there can be advantages in an arrangement in which the drops pass initially closer to one of the associated plates 47 than the other, the gutter 50 being disposed below said one of the associated plates 47. With such an arrangement the charge level on the electrodes 42 to charge drops for projection into the gutter 50 is lower than in the case where the jet paths pass initially centrally between the plates 47. Thus a saving of power is achieved which since seven eighths of the drops are projected into the gutters 50 is a significant consideration.

Figure 6:
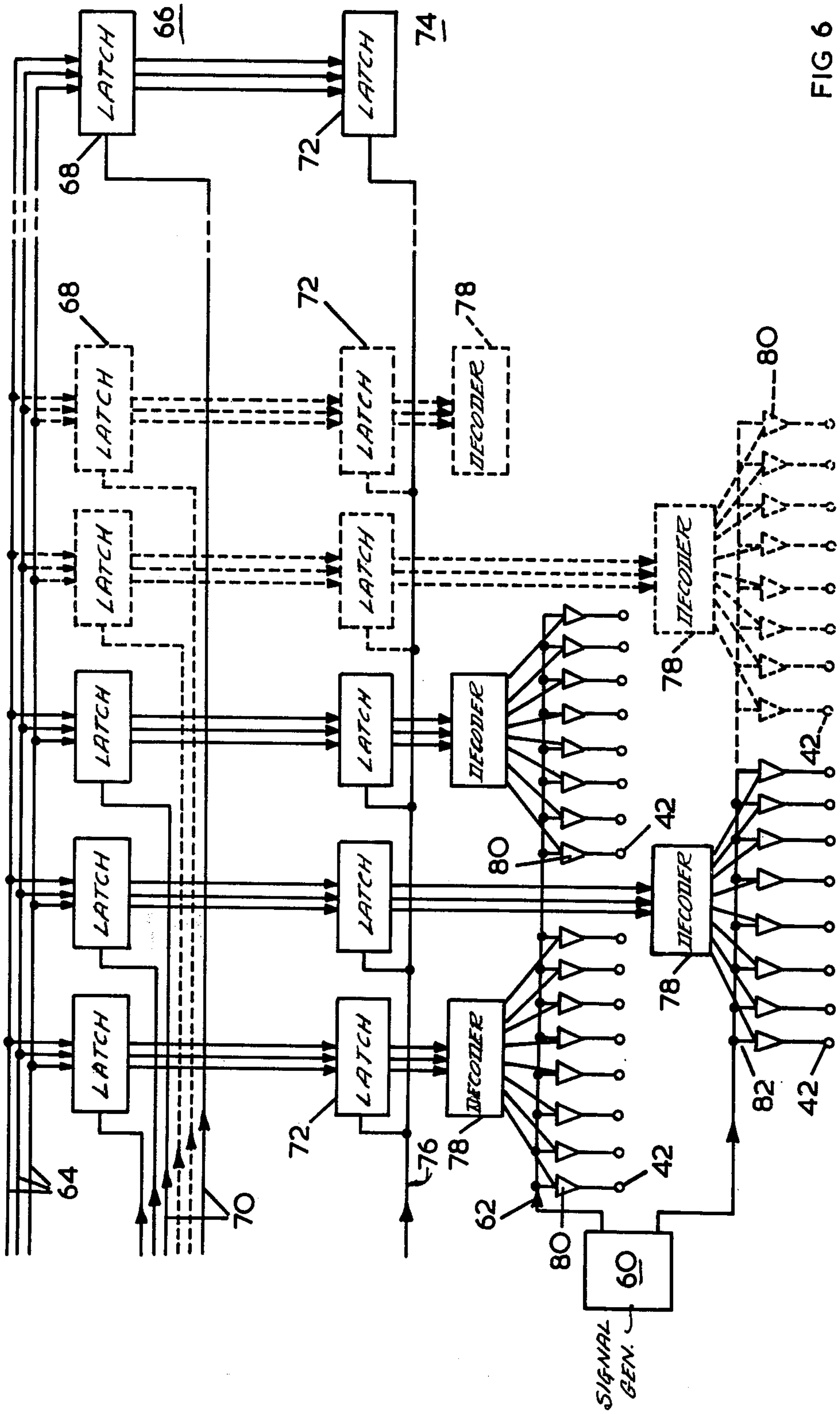

Referring now to FIGS. 6 to 9, a signal generator 60 provides an output signal of constant period in the form of a voltage waveform 62, as shown in FIG. 7, which is normally referred to as a "staircase" function, as well as a similar voltage waveform (not shown) which is the mirror image (with respect to the time axis) of waveform 62. A staircase voltage function is one which spans several time intervals each, in the present context, of duration sensibly equal to the interval between formation of successive drops and the voltage level during each interval is of constant or substantially constant magnitude, the voltage levels being arranged in a preselected sequence. The voltage waveform 62 and its mirror image are available for application to the charge electrodes of respective successive nozzle groups 21. In FIG. 6 is illustrated the electronic control circuitry whereby the voltage waveform 62 and its mirror image waveform at voltage levels in each interval thereof are gated to the appropriate charge electrodes 42 of respective adjacent nozzle groups 21 so that one printing liquid drop of the colour required by the pattern being printed is selected from each nozzle group and deposited at the required location on the surface 12 by virtue of being charged to the prevailing second voltage level as the case may be of the waveform 62 or its mirror image waveform.

It will be assumed that pattern data has been stored line by line in digital form by known techniques in a storage device for example a magnetic tape or disc. For a line of data with m points the order in which the data for each point in the line is stored will not be the natural order (i.e. drop 1, drop 2 etc., drop *m*) because each nozzle group 21 is responsible for the printing of a line section of the print line such line section comprising several drops. The pattern data is accordingly stored in the following order.

| | | | | | | |
|---|---|---|---|---|---|---|
| 1, | (1+*n*), | (1+2*n*), | (1+3*n*), | --- | (1+(*x*−1)*n*) |
| 2, | (2+*n*), | (2+2*n*), | (2+3*n*), | --- | (2+(*x*−1)*n*) |
| 3, | (3+*n*), | (3+2*n*), | (3+3*n*), | --- | (3+(*x*−1)*n*) |
| 4, | (4+*n*), | (4+2*n*), | (4+3*n*), | --- | (4+(*x*−1)*n*) |
| '' | '' | '' | '' | | '' |
| '' | '' | '' | '' | | '' |
| '' | '' | '' | '' | | '' |
| *n*, | (*n*+*n*) | (*n*+2*n*) | (*n*+3*n*) | --- | (*n*+(*x*−1)*n*) |
| i.e. *n* | 2*n* | 3*n* | 4*n* | | *xn* |

where

*n* = the number of drops deposited on the print surface in a line section by each nozzle group 21.

x = the number of nozzle groups in the apparatus, and

*m* = *nx*

It will be seen that the first line of the above data matrix describes the first drops deposited by each nozzle group 21, whilst the second line of the matrix describes the second drops deposited by each nozzle group and so on through to the 'n' line which describes the final drop in each print line section deposited by the nozzle groups 21. It will also be apparent that the first nozzle group deposits 1, 2, 3, 4 as shown in the first column of the matrix, the second nozzle group deposits (1+*n*), (2+*n*), (3+*n*) as shown in the second column of the matrix and so on.

Data relating to individual drops is in the form of three bit words and is read from data lines 64 into a first buffer store 66 comprising a series of high speed bistable three bit latches 68 the number of latches corresponding with the number of nozzle groups 21. The three bit words of each line of the data matrix are thus loaded in sequence into the respective latches of the buffer store by means of clock pulses supplied to individual clock lines 70 connected to the latches 68, the data appearing on the output of the latches shortly after the clock pulses are applied.

When the clock pulses in clock lines 70 have transferred one complete line of information of the data matrix into the latches 68, bistable latches 72 of a second buffer store 74 are clocked by means of a clock pulse supplied to clock line 76. The three bit words constituting the entire data matrix line are thus simultaneously loaded in parallel into latches 72. The latches 68 are then loaded again in sequence by clock pulses in clock lines 70 with the three bit words constituting the next line of the data matrix.

The data at the output of the latches 72 is presented to three-to-eight line decoders 78, the eight line outputs of each of which are connected to respective driver circuits 80 which in turn supply the charge electrodes 42 of a nozzle group 21. As will be seen from the truth table of FIG. 9, the three bit word which has bits A, B and C appear at the input of any one of the three-to-eight line decoders in eight possible forms and depending on which form is presented to the decoder so one of its output lines 1 to 8 is energised with the result that the corresponding driver circuit 80 connects the prevailing voltage of the staircase 62 or its mirror image to the charge electrode 42 supplied by that driver circuit. A drop of appropriate colour is thus selected in each nozzle group 21 and deposited on the printing surface. The process is repeated a number of times equal to the number of drops in the line section deposited in the printing line by each nozzle group 21 whereupon printing of one line is completed and printing of the next line commences. The electrodes 42 of each group in the absence of the staircase voltage 62 are subject to a standing first voltage level which is sufficient to impart to the drops formed therein a charge adequate to cause those drops to be deposited in the gutter 50. When, according to the three bit word at the input of each decoder, one of the electrodes 42 has the second prevailing voltage level of the staircase voltage 62 applied to it, that electrode 42 causes the drop then formed to be so charged as to be deposited on the appropriate point of the said surface 12.

The driver circuit 80 shown in detail in FIg. 8 includes a line 82 to which the staircase voltage waveform of FIG. 7 is applied, the latter voltage waveform consisting of a cycle of sixteen voltage levels, twelve above and four below ground. At each level of the staircase voltage waveform the voltage remains constant for a sufficient interval to span the formation in the jet paths at the location of the charge electrodes 42 of one drop. The output connections of the three-to-eight line decoders 78 are each connected to the emitter of p-n-p transistors 85 of each driver circuit. The base of transistor 85 is grounded and the collector connected via series resistors 87 and 89 to negative line 91. The common point of resistors 87 and 89 connects to the base of n-p-n transistor 84 the emitter of which is connected to line 91 and the collector via series resistors 93 and 95 to line 82. The common point of resistors 93 and 95 is connected to the base of p-n-p transistor 90 the emitter of which is connected to line 82 while the collector is connected by way of resistor 92 to the negative line 91. The output 94 at the collector of transistor 90 is connected to charge electrode 42 and in the absence of any signal at the emitter of transistor 85 held at the voltage of the negative line which is several voltage levels, say eight levels, below the most negative voltage of the staircase function. Thus drops formed in all electrodes 42 at the driver circuits of which no signal is received from the decoders 73 are equally charged with a negative voltage of sufficient magnitude to ensure deflection into the appropriate gutter 50. When a signal in the form of a positive voltage pulse appears at the emitter of transistor 85, that transistor conducts and thus switches transistors 84 and 90 into conduction so that the staircase voltage level prevailing at the time appears at the output to effect charging to the level of the corresponding charge electrode 42.

It will be appreciated that the driver circuit of FIG. 8 is applicable to those drivers 80 which connect staircase function waveform 62 to the charge electrode 42 of alternate nozzle groups. A generally similar type of driver circuit is required for connecting the mirror image staircase function of voltage waveform 62 to the charge electrodes 42 of the remaining nozzle groups.

Figure 10:
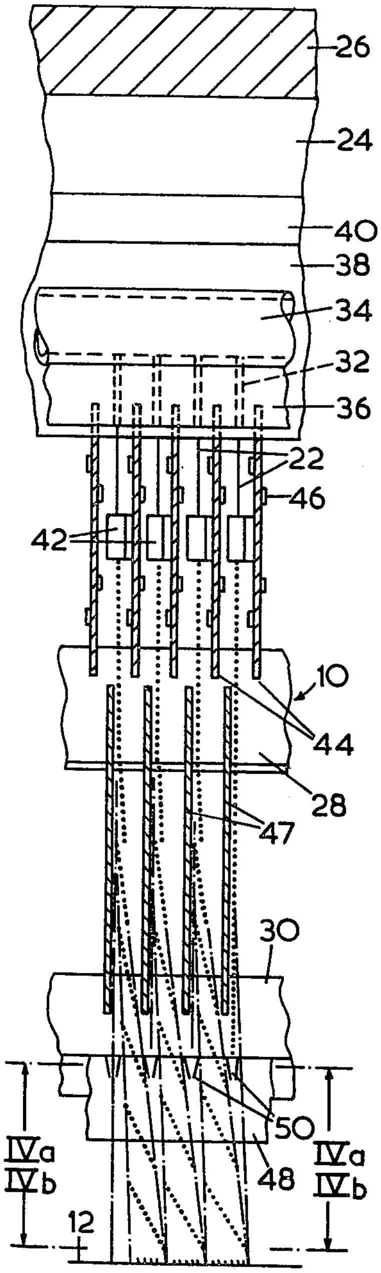
FIG. 10, is a sectional view taken on the line III—III of FIG. 2.

The gutter may be situated to receive either deflected or undeflected drops. Referring to FIG. 10 it will be seen that uncharged drops for example in the jet path from the nozzle 32 at the right hand side of the drawing pass straight through to the gutter 50 on that particular path. In the paths from the remaining nozzles 32 the effect is illustrated of giving drops in sequences of ten drops charges that decrease by uniform steps. It will be seen that the drops of each sequence are deflected in accordance with the charge they carry and that the charges on the drops and the potential gradient of the electrostatic field between the plates 47 are such that the drop sequences are deposited in line sections of ten drops each which because of the inclination of the plates 47 to the direction of travel of the printing surface lie in end to end relationship on the printing surface.

Figure 11:
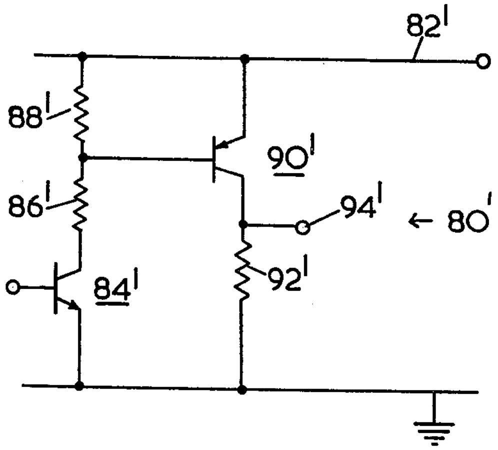
FIG. 11, illustrates a circuit detail of the circuit diagram of FIG. 6, and FIG. 12, illustrates a voltage waveform in the form of a staircase.
Figure 12:
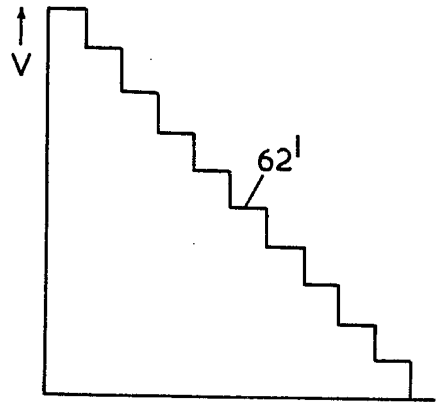

The control circuitry for the embodiment of FIGS. 10–12 is identical to the circuitry of FIG. 6 except for the signal generator which provides a voltage waveform 62′, as shown in FIG. 12, which is normally referred to as a staircase function, as well as a similar voltage waveform (not shown) which is the mirror image (with respect to the time axis) of waveform 62′. Waveform 62′ is identical to the waveform of FIG. 7 except that it decreases to zero rather than a negative voltage. As in the embodiment of FIGS. 1–9, the voltage waveform 62′ and its mirror image are available for application to the charge electrodes 42 of respective successive nozzle groups 21.

Referring to FIG. 11 the driver circuit 80′, includes a line 82′ to which the staircase voltage is applied, the output line of the three-to-eight line decoder connects with the base electrode of n-p-n transistor 84′, the emitter electrode of which is grounded and the collector electrode of which is connected by way of resistors 86′ and 88′ to line 82′. The junction of resistors 86′ and 88′ is connected to the base electrode of p-n-p transistor 90′ the emitter electrode of which is connected to the line 82′ while the collector electrode is connected by way of resistor 92′ to ground and also to output terminal 94′. When the output line of the three-to-eight line decoder to which the base electrode of transistor 84′ is connected is energised, transistor 84′ conducts and thereby establishes sufficient emitter to base voltage at transistor 90′ to render that transistor conducting. The staircase function voltage prevailing on the line 82′ when transistor 90′ becomes conducting thus appears between the output terminal 94′ and ground, the output terminal being connected to a charge electrode 42.

It will be appreciated that the driver circuit of FIG. 12 is applicable to those drivers 80 which connect staircase function waveform 62′ to the charge electrode 42 of alternate nozzle groups. A generally similar type of driver circuit is required for connecting the mirror image staircase function of voltage waveform 62′ to the charge electrodes 42 of the remaining nozzle groups.

Instead of staircase voltage functions, there can alternatively be employed ramp voltage functions, i.e. periodic voltages during each interval of which linear increase or decrease of voltage occurs. However the advantages of a staircase function as compared with a ramp voltage function is that the charge applied to a particular drop is the same notwithstanding that the precise instant of separation of the drop may be within small limits of time variable.

As a further alternative to a staircase voltage function there may be employed a cyclical voltage function each cycle of which comprises a sequence of constant voltage levels which are ordered otherwise than in the form of a staircase. The effect of using such a voltage function would be that the drops deposited in the line section corresponding with any particular group 21 of nozzles woould not be deposited one at a time from one to the other end of the line section but in an order depending on the sequence of voltage levels in each cycle.

In the case of the apparatus having a single row of printing guns an uncoloured line can be produced across the full width of the printing surface by only applying to the charge electrode means of each printing gun in the row the first voltage level necessary to ensure that the sequence of drops produced by each printing gun is deflected into the drop intercepting device relating to that particular printing gun.

In the case of the apparatus suitable for plural colour printing which has a plurality of rows of printing guns an uncoloured line can be produced across the full width of the printing surface by supplying one of the rows of printing guns with a colourless ink, and then applying to the charge electrode means of all the printing guns in this row the second voltage level of the output signal so that the sequence of uncoloured drops produced by the printing guns in this row are deposited on the printing surface while the coloured drops produced by the printing guns in the other rows are collected in the drop intercepting device. Alternatively in the case of this particular apparatus an uncoloured line can be produced across the full width of the printing surface by collecting all the drops produced by each group of guns in the appropriate drop intercepting device, in other words all of the guns in each group are charged to a charge corresponding to the first voltage level of the signal voltage. For this purpose it is necessary to provide additional data relating to individual drops and this can be achieved by use of four bit words which thus enable each gun in a group of eight guns to be individually charged to the appropriate level of the signal voltage or to receive only the first voltage level necessary to deflect the drop to its appropriate drop intercepting device.

Those skilled in the art will appreciate that by employment of multi bit words of more than three bits each it becomes possible simultaneously to deposit more than one drop on a specific point of the print surface from each group of eight nozzles.

While the invention has been described in relation to a fabric printer, it could equally well be applied to other forms of printing, for example, a paper printer.

We claim:

1. Pattern printing apparatus for printing by depositing on a surface to be printed, during relative movement between the apparatus and the said surface, small drops of printing liquid in successive rows of contiguous and solid drops extending transversely to said direction of relative movement, comprising a plurality of rows of printing guns, means for mounting said guns with each row extending transversely to said direction of relative movement and with said rows extending arcuately in an array, and each gun having an orifice, printing liquid supply means for supplying printing liquid under pressure to the orifices so that a gun in each row is included in a group of guns with each gun in the group forming a jet of printing liquid directed towards the same location in the apparatus of the said surface, all of the guns in a row of printing guns being supplied with the same colored printing liquid and each row of guns being supplied with a different colored printing liquid, means for imparting regularly spaced variations in the cross-section of the jet to stimulate drop formation, charge electrode means located adjacent the position in the jet path of drop separation to effect charging of drops formed in the jet path to a charge corresponding to a first voltage level or to a charge corresponding to any of a plurality of second voltage levels, drop deflection means for providing a substantially constant electrostatic field through which pass the drops formed in the jet path thereby to deflect each electrically charged drop in a direction transverse to said direction of relative movement as a function of the charge level on that drop, drop intercepting means for intercepting those drops which have been charged to a charge corresponding to said first voltage level, and control circuit means responsive to pattern information signals for producing an electrical signal in the form of first or second voltage levels and applying the said signal to said charge electrodes, including means for applying the said signal to cause at most one of said charge electrodes of said guns of each said group to be charged to one of said second levels and the remaining charge electrodes of the other guns of each said group to be charged to said first voltage level, the deposited drops forming a solid line segment so that successive rows of drops form a pattern.

2. Apparatus as in claim 1 wherein said first voltage level is 0 so that drops charged to said first voltage level are uncharged and thus undeflected by passage through said deflection means.

3. Apparatus as in claim 1 wherein said first voltage level has a value outside the range of any of said second voltage levels.

4. Apparatus as in claim 1 wherein the output signal defining the second voltage level is of constant period, the period being sufficient to span formation of a plurality of drops from each gun, and the voltage levels in each period being in the form of a staircase.

5. Apparatus as in claim 4 wherein said output signal spans zero voltage.

6. Apparatus as in claim 1 further including means for producing said electrical signals defining the pattern to be printed comprising a first buffer store, means for sequentially loading words of a data matrix into said store, a second buffer store, means for simultaneously loading the contents of said first buffer store into said second store, means for decoding the output of said second store, driver circuit means for receiving said output signal of constant period and said signal defining said first voltage level, and coupling said output signal or signal defining said first voltage level to said charge electrodes in accordance with the decoded output of said second store.

7. Pattern printing apparatus adapted to print by depositing on a surface to be printed during relative movements between the apparatus and the said surface small drops of printing liquid, comprising a plurality of rows of printing guns, each row of printing guns extending transversely to said direction of relative movement, corresponding guns in each row forming groups of guns disposed longitudinally in said direction of relative movement, the guns in each group being directed towards the same location of the said surface, each gun having an orifice, printing liquid supply means for supplying printing liquid under pressure to the orifice to form a jet of printing liquid directed towards the location in the apparatus of the said surface, all of the guns in a row of printing guns being supplied with the same colored printing liquid and each row of guns being supplied with a different colored printing liquid, means for imparting regularly spaced variations in the cross-section of the jet to stimulate drop formation, charge electrode means located adjacent the position in the jet path of drop separation to effect charging of drops formed in the jet path to a charge corresponding to a first voltage level or to a charge corresponding to any of a plurality of second voltage levels, the first voltage level being either below or above any of the second voltage levels, drop deflection means for providing a substantially constant electrostatic field through which pass the drops formed in the jet path thereby to deflect electrically charged drops to an extent dependent upon the charge levels on the drops, and, a drop interceptive means for intercepting those drops which have been charged to a charge corresponding to the first voltage level, the apparatus also including signal generating means which make available for application to the charge electrode means of each printing gun an output signal of constant period, the magnitude of the voltage of said signal at corresponding times during each period thereof being constant and the period of which is sufficient to span the formation of a plurality of drops in each jet path, and electrical switch means controlled by pattern information to control the application of the output signal at predetermined voltage levels during each period thereof to charge electrode means of the printing guns thereby to charge drops formed in the jet paths of the printing guns so that the drop or drops charged to a charge corresponding to a second voltage level for deposition on the said surface in each group of printing guns during a period of the output signal are deposited in a solid row extending transversely to the direction of relative movement between the apparatus and the said surface; each of said printing guns being arranged for the operating electrical parameters of the signal generating means so that successive drops therefrom in any sequence formed during a period of the output signal and charged to a charge corresponding to a second voltage level for deposition on the said surface as well as corresponding drops in sequence formed in successive periods of the output signal and charged to a charge corresponding to a second voltage level for deposition on the said surface are deposited at a spacing to present a visual solid printing impression of contiguous drops on the said surface and successive print guns in each row being spaced for the operating electrical parameters of the signal generating means so that all the drops formed by one gun during any period of the output signal if charged to a charge corresponding to a second voltage level for deposition on the said surface and all the drops formed by the next adjacent gun during the same period of the output signal if charged to a charge corresponding to a second voltage level for deposition on the said surface are deposited at a spacing to present a visual printing impression of solid contiguous drops on the printing surface, whereby, in operation, drops formed in the guns which are charged during each period of the output signal to a charge corresponding to a second voltage level are deposited on the said surface in a row extending transversely to the direction of relative movement between the apparatus and the printing surface, the deposited drops in successive rows forming a solid printed pattern.

8. Apparatus as in claim 7 wherein said first voltage level is zero so that drops to which said first voltage level is applied are uncharged and thus undeflected by passage through said deflection means.

9. Apparatus as in claim 7 wherein the voltage levels in each period are in the form of a staircase.

10. Apparatus as in claim 9 wherein said output signal begins each period at a level below zero voltage and increases to a level above zero voltage.

11. Apparatus as in claim 7 further including means for producing said electrical signals defining the pattern to be printed comprising a first buffer store, means for sequentially loading wordss of a data matrix into said store, a second buffer store, means for simultaneously loading the contents of said first buffer store into said second store, means for decoding the output of said second store, driver circuit means for receiving said output signal of constant period and said signal defining said first voltage level, and coupling said output signal and said signal defining said first voltage level to said charge electrodes in accordance with the decoded output of said second store.

12. Pattern printing apparatus as claimed in claim 7 wherein the printing liquid supply means for each row are common to the orifices of all the printing guns of that row.

13. Pattern printing apparatus as claimed in claim 7 wherein the drop intercepting means for adjacent orifices in a row are disposed at such a height and so mutually spaced as to permit the passage therebetween of all drops which have been charged to a charge corresponding to a second voltage level from one of said orifices.

14. Pattern printing apparatus as claimed in claim 7 further including a pattern information store in which pattern information is stored in digital coded form, buffer store means into which pattern information from the digital store is loaded, means for transferring information loaded into the buffer store into decoding means, driver circuits connected each with a charge electrode means and supplied from the decoding means and adapted, when supplied from the decoding means, to connect the signal voltages to the charge electrode means.

* * * * *